(12) United States Patent
Oran

(10) Patent No.: US 7,167,451 B1
(45) Date of Patent: Jan. 23, 2007

(54) USER CONTROLLED AUDIO QUALITY FOR VOICE-OVER-IP TELEPHONY SYSTEMS

(75) Inventor: David R. Oran, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 966 days.

(21) Appl. No.: 09/745,387

(22) Filed: Dec. 21, 2000

(51) Int. Cl.
*H04L 12/26* (2006.01)
*H04L 12/28* (2006.01)
*H04L 12/56* (2006.01)
*H04L 12/66* (2006.01)
*G06F 15/173* (2006.01)

(52) U.S. Cl. .................. 370/252; 370/352; 370/395.21; 709/226

(58) Field of Classification Search ................ 370/229, 370/230, 232, 235, 237, 351, 389, 395.1, 370/395.5, 395.52, 466, 395.21, 401, 252, 370/352; 709/226
See application file for complete search history.

(56) References Cited

U.S. PATENT DOCUMENTS

| | | | | |
|---|---|---|---|---|
| 5,689,557 A | * | 11/1997 | Kaplan ................... | 379/355.05 |
| 5,844,918 A | * | 12/1998 | Kato .......................... | 714/751 |
| 5,856,971 A | * | 1/1999 | Gitlin et al. ................ | 370/335 |
| 6,141,788 A | * | 10/2000 | Rosenberg et al. ......... | 714/774 |
| 6,198,910 B1 | * | 3/2001 | Hanley ..................... | 455/67.11 |
| 6,259,691 B1 | * | 7/2001 | Naudus ...................... | 370/352 |
| 6,282,192 B1 | * | 8/2001 | Murphy et al. ............. | 370/352 |
| 6,300,887 B1 | * | 10/2001 | Le .............................. | 341/60 |
| 6,332,084 B1 | * | 12/2001 | Shaanan et al. ............ | 455/566 |
| 6,570,849 B1 | * | 5/2003 | Skemer et al. ........... | 370/230.1 |
| 6,577,648 B1 | * | 6/2003 | Raisanen et al. ........... | 370/503 |
| 6,611,694 B1 | * | 8/2003 | Oltedal et al. .............. | 455/560 |
| 6,668,046 B1 | * | 12/2003 | Albal .......................... | 379/119 |
| 6,675,340 B1 | * | 1/2004 | Hardie et al. ............... | 714/751 |
| 6,690,651 B1 | * | 2/2004 | Lamarque et al. .......... | 370/252 |
| 6,735,175 B1 | * | 5/2004 | Havens ....................... | 370/236 |
| 6,775,265 B1 | * | 8/2004 | Oran .......................... | 370/352 |
| 6,775,267 B1 | * | 8/2004 | Kung et al. ................. | 370/352 |
| 2002/0015395 A1 | * | 2/2002 | Karagiannis ................ | 370/338 |
| 2002/0110112 A1 | * | 8/2002 | Tuomi ........................ | 370/352 |
| 2003/0095504 A1 | * | 5/2003 | Ogier ......................... | 370/235 |
| 2004/0179515 A1 | * | 9/2004 | Kamani et al. ............. | 370/352 |

* cited by examiner

*Primary Examiner*—Seema S. Rao
*Assistant Examiner*—Gregory B. Sefcheck
(74) *Attorney, Agent, or Firm*—Marger Johnson & McCollom, P.C.

(57) ABSTRACT

A call adaptation system tracks adaptation schemes used for transmitting audio packets in a Voice Over IP call. A user response to the Voice Over IP (VoIP) call is monitored. The call adaptation system then dynamically varies the adaptation schemes used for transmitting the audio packets according to the monitored user response.

52 Claims, 6 Drawing Sheets

USER CONTROLLED AUDIO QUALITY FOR VOICE-OVER-IP TELEPHONY SYSTEMS

BACKGROUND

Public Switched Telephone Network (PSTN) telephony offers only one level of service based on the use of a single audio quality regime. For example, the PSTN uses 64 kilobits Per Second (BPS) Pulse Code Modulated (PCM) audio with a 300–3400 Hertz passband. PSTN telephony further offers only one control regime that deterministically either grants or denies service rather than degrading service when a failure or network congestion occurs.

Voice-Over-Internet Protocol (VoIP) systems are often built to mimic this service regime but are also inherently more flexible. Certain VoIP protocols and algorithms can adapt to varying service levels. Example adaptations include either denying service or degrading service when resources cannot be reserved, or reserved resources become unavailable. Different encoder/decoders (Codecs) are switched in and out if bandwidth becomes more or less scarce. Forward Error Correction (FEC) can be added or removed as packet error rates change. Packetization intervals can also be varied to either limit bandwidth utilization or limit packet transmission rate.

To date these adaptations have been statically provisioned by the network designer and are not user controllable. The problem is that these adaptations may not be optimized for the current telephone users or the current VoIP call. For example, a given quality of service may be more than adequate for one user. However, that same given quality of service may be unsatisfactory to a different user.

The present invention addresses this and other problems associated with the prior art.

SUMMARY OF THE INVENTION

A call adaptation system tracks adaptation schemes used for transmitting audio packets in a Voice Over IP call. A user response to the Voice Over IP (VoIP) call is monitored. The call adaptation system then dynamically varies the adaptation schemes used for transmitting the audio packets according to the monitored user response.

DETAILED DESCRIPTION

Figure 1:
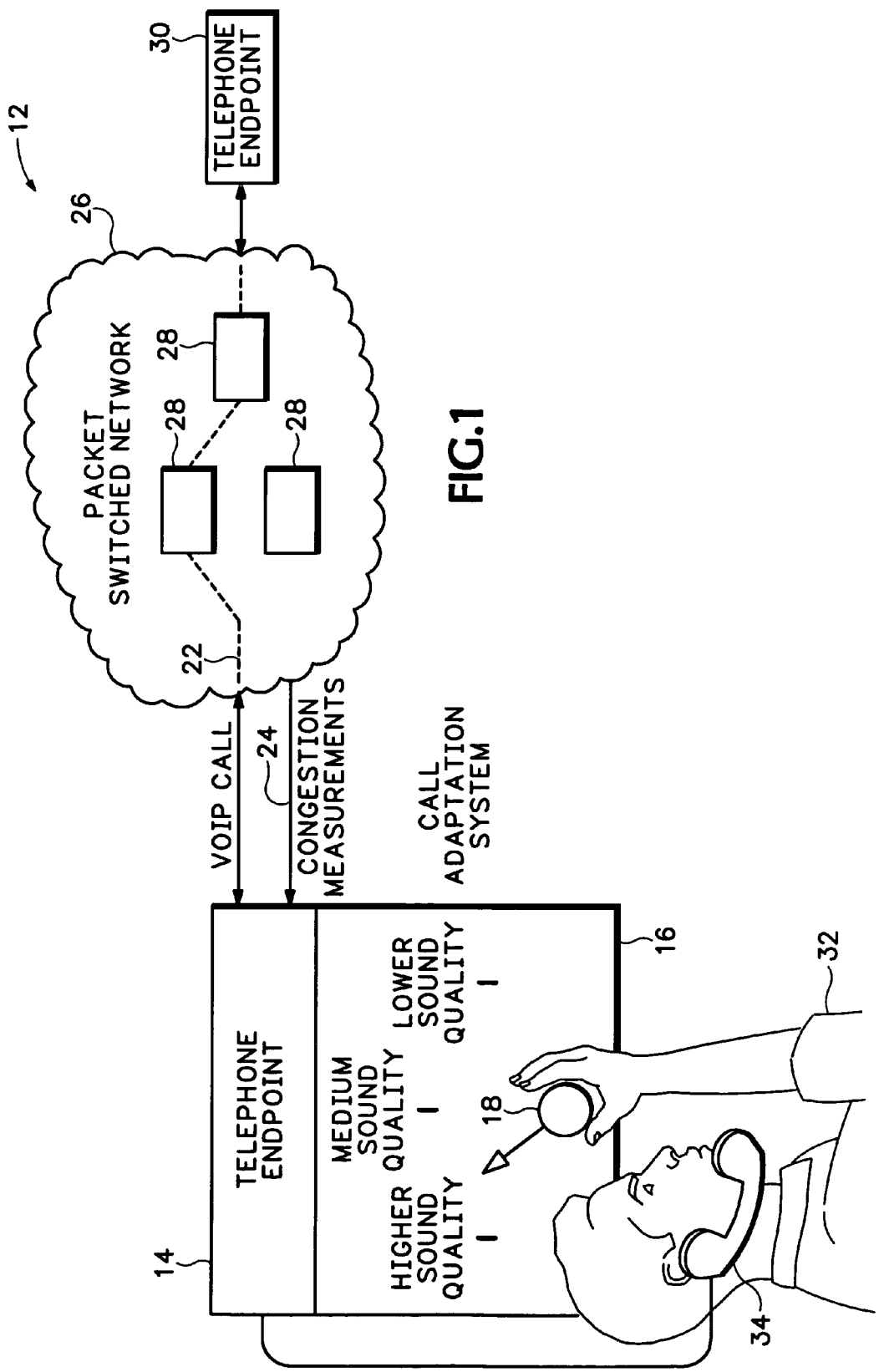
FIG. 1 is a diagram of a communications network including a call adaptation system.

FIG. 1 shows a communications network 12 that includes a packet switched network 26. The packet switched network 26 includes multiple network processing devices 28 that connect Voice Over Internet Protocol (VoIP) calls between different telephony end points. For example, a VoIP call 22 is established between endpoint 14 and endpoint 30. The network processing devices 28 can be any routers, switches, gateways, concentrators, etc., used for transferring packets over the packet switched network 26.

A call adaptation system 16 includes a user input device 18 that receives inputs directly from a user 32. The call adaptation system 16 allows the user 32 to dynamically control audio quality by dynamically varying call adaptation parameters used for conducting the VoIP call 22.

The user 32 initiates the VoIP call over the telephone endpoint 14. The user 32 then communicates with endpoint 30 through handset 34. If there is a desire to vary the perceived audio quality of the VoIP call 22, the user 32 adjusts input device 18. For example, the user 32 may perceive the VoIP call 22 as having unsatisfactory sound quality. The user can turn input device 18 in a counter-clockwise direction in an attempt to increase sound quality of the VoIP call 22. The call adaptation system 16 then varies call adaptation parameters that improve sound quality.

In another example, the user 32 may think the sound quality of the VoIP call 22 is just fine. However, the user 32 wants to reduce the cost of the VoIP call 22. The user 32 turns the input device 18 in a clockwise direction in an attempt to reduce call cost. The call adaptation system 16 then modifies the call adaptation parameters, such as used bandwidth, to reduce the cost of the VoIP call 22. These adjustments to the adaptation parameters may reduce the sound quality of the VoIP call 22.

The user 32 can control how hard the call adaptation system 16 tries to vary the current sound quality in the VoIP call 22. The user 32 can control the adaptation parameters both before and during the VoIP call 22.

The input device 18 differs depending on the instrument used for establishing the VoIP call 22. For example, a physical knob or screen control may be used on an IP phone. A graphical slider or similar icon representation may be used on a Personal Computer (PC) phone. The input device 18 can have two extreme settings and any number of intermediate settings. Examples of some of these embodiments are shown below in FIGS. 5 and 6.

Figure 2:
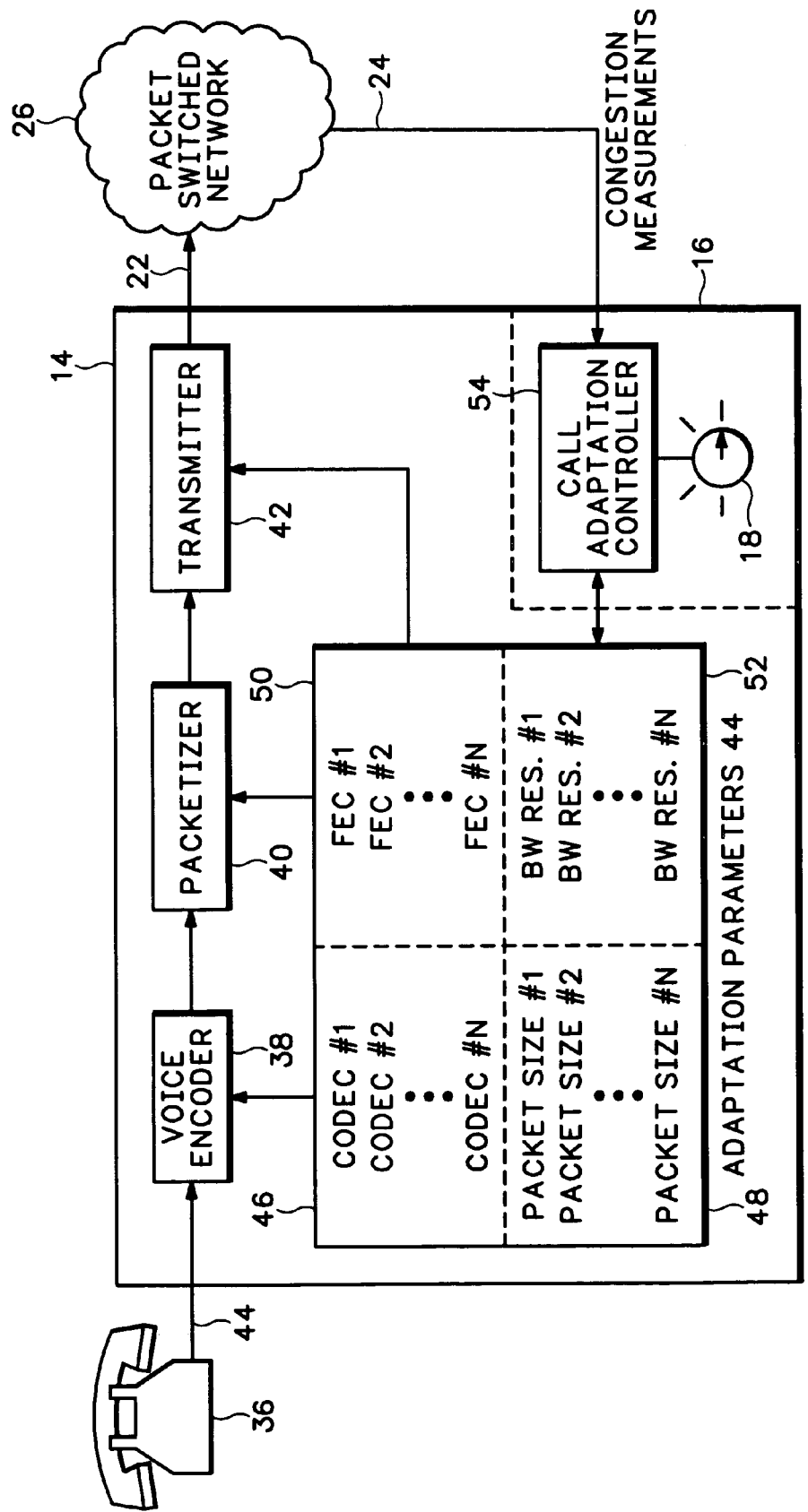
FIG. 2 is a detailed diagram of the call adaptation system shown in FIG. 1.

FIG. 2 is a detailed diagram of the telephony endpoint 14 and the call adaptation system 16 shown in FIG. 1. A phone 36 generates audio signals 44 that are encoded into digital data by a voice encoder 38. A packetizer 40 converts the digital data into Voice over IP (VoIP) packets that are then transmitted over the packet switched network 26 through a transmitter interface 42.

The voice encoder 38, packetizer 40 and transmitter 42 use adaptation parameters 44 for encoding and packetizing the audio signals from phone 36. For example, different voice coder algorithms 46 are used by voice encoder 38 to convert the analog audio signals 44 into digital data. Two examples of voice coders are International Telecommunications Union (ITU) Standards G.723.1 and G.711. These different voice coders 46 encode different amounts of audio signals into digital data and ultimately vary the sound quality of the VoIP call 22.

In another example, different packet payload sizes 48 can be used by packetizer 40 when converting the digital data from voice coder 38 into VoIP packets. These packet payload sizes 48 can vary the amount of delay experienced during the VoIP call 22. Varying packet payload according to measured network congestion is described in U.S. patent application Ser. No. 09/181,947, filed Oct. 28, 1998, entitled: CODEC-INDEPENDENT TECHNIQUE FOR MODULATING BANDWIDTH IN PACKET NETWORK now patented as U.S. Pat. No. 6,421,720.

Another adaptation parameter is the type of Forward Error Correction (FEC) 50 used, if any, to prevent packet loss during the VoIP call 22. A bandwidth reservation parameter 52 identifies an amount of bandwidth, if any, the endpoint 20 attempts to reserve on the packet switched network 26 for the VoIP call 22.

A call adaptation controller 54 in the call adaptation system 16 adjusts the adaptation parameters 44 according to the user response detected from input device 18. The call adaptation controller 54 can also vary the adaptation parameters 44 according to the congestion measurements 24 received from packet switched network 26. This is described below in FIG. 4.

It should be understood that this is just an example of the types of adaptation parameters 44 that may be used to adjust the sound quality of the VoIP call 22. The call adaptation system 16 can use other parameters that vary the sound quality of the VoIP call 22.

Mid-Call Resource Reservation

Figure 3:
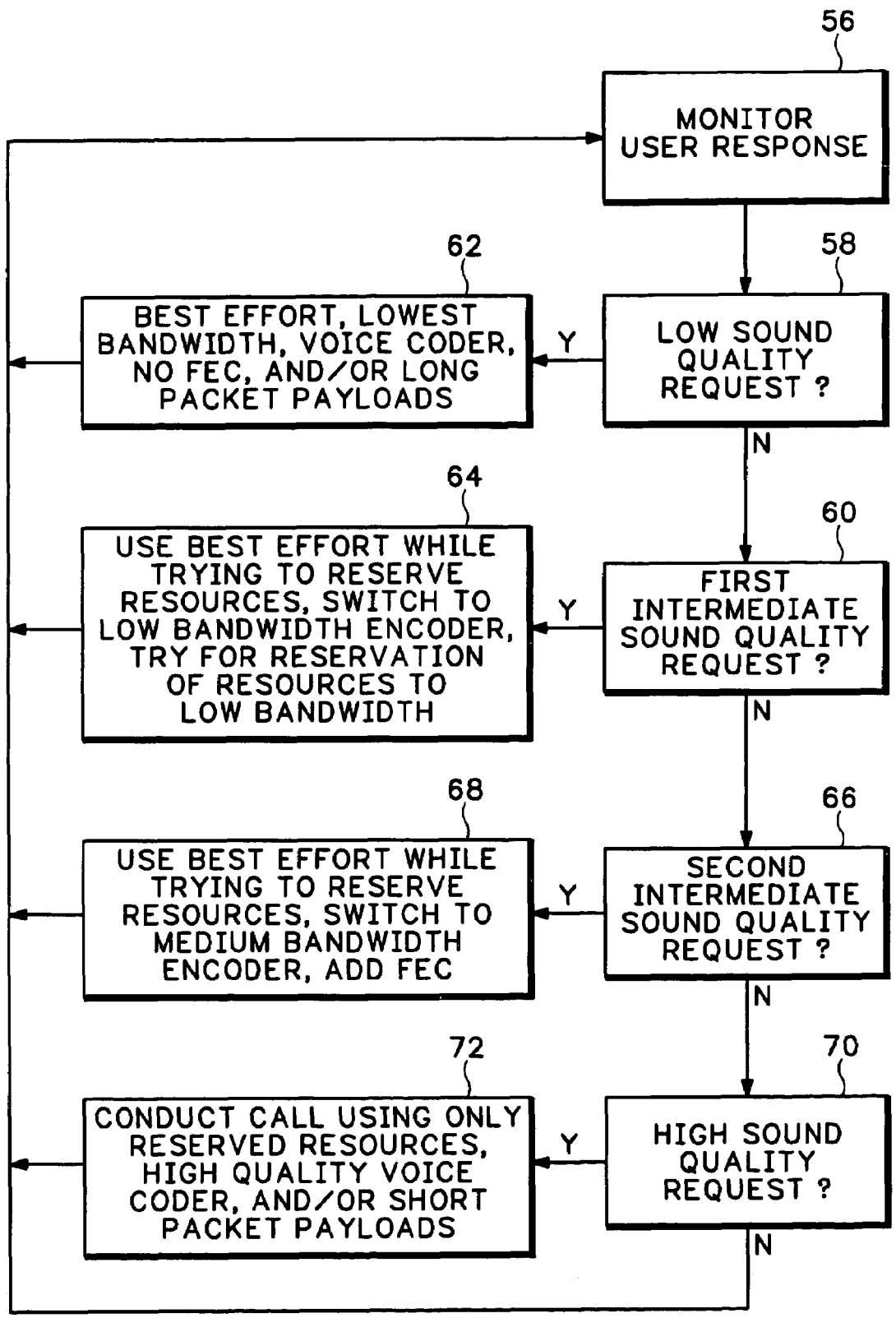
FIG. 3 is a block diagram showing how the call adaptation system modifies different adaptation parameters.

FIG. 3 shows in further detail how the call adaptation system 16 isolates the user 32 from network congestion by initiating or terminating resource reservation and/or by modulating packetization, forward error correction, and the codec. The call adaptation system 16 decides mid-call whether to reserve network resources for the VoIP call or to use a best effort scheme according to the monitored user response. For example, at a low sound quality user setting, the VoIP call may use a best effort scheme for establishing and conducting the VoIP call. At a higher sound quality user setting, the VoIP call may try to reserve network resources.

User response to the VoIP call is continuously monitored in block 56. If a low sound quality request is detected in block 58, the call adaptation controller 54 (FIG. 2) uses best effort packet traffic to establish or continue the current VoIP call. Best effort packet traffic is defined as VoIP packets that are transmitted with no pre-reservation of network resources. Thus, if a network processing device in the packet based network is congested, some or all of the VoIP packets may be dropped before reaching their destination point.

With the low sound quality request, a low quality voice coder is selected by the call adaptation system. The low quality voice coder uses a relatively small number of digital bits to represent a given portion of an audio signal. At the low sound quality setting no Forward Error Correction (FEC) and relatively long packet payloads might be used in the VoIP call.

If the user makes a first intermediate sound quality request in block 60, the adaptation system initiates a request to reserve network resources but also accepts best effort traffic while trying to reserve the network resources. One protocol used for reserving network resources is the Resource Reservation Protocol (RSVP). The RSVP protocol works through a protocol exchange which visits each network processing node along the VoIP media path. The RSVP messages request network processing devices along a media path to reserve a particular packet bandwidth.

The call adaptation system provides a unique resource reservation scheme that launches resource reservation mid-call. The first intermediate voice quality request detected in block 60 launches the RSVP reservation request mid-call in block 64. If the RSVP reservation request is accepted by all the network processing nodes in the media path, then the call adaptation system has locked down the resources for providing higher voice quality. If the user then requests even higher sound quality, the call adaptation system can increase the packet rate and be assured the network can handle the increased bandwidth requirement for the VoIP call.

If the RSVP request is not accepted, then the call adaptation system may not be able to improve voice quality if the user requests improved sound quality. In this case, there may be no improvement in sound quality if the user increases the voice quality request. The call adaptation system in block 64 may also switch to a better quality voice coder and/or reduce the packet payload size.

If a second intermediate sound quality request is detected in block 66, best effort traffic may still be used but a better quality voice coder and/or even shorter packet payloads may be used in block 68. In combination with the other adaptation parameter modifications, or by itself, FEC may be added to the VoIP call.

If a high sound quality request is detected in block 70, the VoIP call is conducted using only reserved network resources in block 72. A highest quality voice coder is used along with possibly an even shorter packet payload and FEC. The call adaptation system then continues to monitor for new user sound quality requests in block 56.

The example described above is for illustrative purposes. As described above, alternative implementations can also be used. For example, each user setting may include modification of a different one or different combinations of the adaptation parameters described above. Each setting may modify just one or a subset of the adaptation parameters described above. Alternatively, additional settings may provide smaller changes to the adaptation parameters or charge adaptation parameters not mentioned above.

Modifying Adaptation Parameters Based On Congestion Measurements

Referring briefly back to FIG. 1, to improve voice quality, it may be tempting to simply "crank up the gain" by injecting a higher packet rate into the VoIP call 22. However, this can actually increase congestion in the packet network 26 and be counter-productive to improving audio quality. The call adaptation system 16 takes congestion measurements 24 into account through jitter and/or packet loss measurements. These congestion measurements 24 are conveyed back to the call adaptation system 16 using existing control protocols such as the Real Time Control Protocol (RTCP). The call adaptation system 16 takes the network congestion measurements 24 into account when adjusting the adaptation parameters to improve responsiveness to the user sound quality requests.

Figure 4:
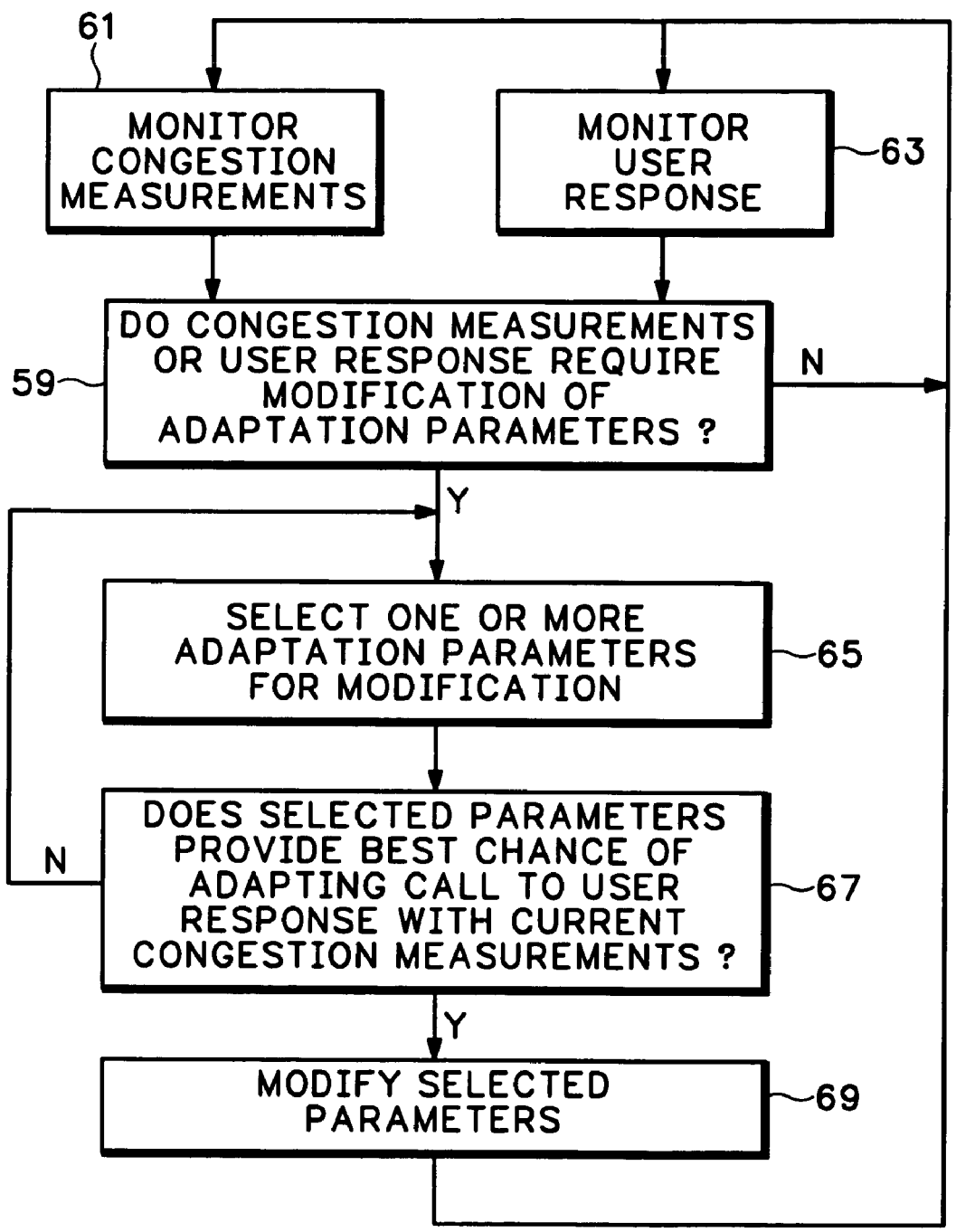
FIG. 4 is a block diagram showing how the call adaptation system modifies different adaptation parameters according to network congestion measurements.

FIG. 4 shows how the call adaptation system 16 uses the congestion measurements 24 to determine what adaptation parameters 36 are used for varying the quality of the VoIP call 22. Referring to both FIG. 1 and FIG. 4, congestion measurements 22 are monitored in block 61 and the user response to the current VoIP call is monitored in block 63. In one example, the call adaptation system 16 may receive an RTCP message in block 59 indicating that a certain number of the VoIP packets are being dropped during transmission. A user response may also be detected in block 59 requesting an increase in sound quality.

Block 59 determines if the current congestion measurements or the current user response requires modification of the VoIP call adaptation parameters. For example, the number of lost packets identified in the congestion measurements may indicate that the sound quality requested from the current user response is not currently being met. Alternatively, a new user sound quality request may not be provided by the currently used adaptation parameters.

If it is determined that adaptation parameters need to be modified, the call adaptation system selects one or more adaptation parameters in block 65. The selected adaptation parameters are compared to the congestion measurements and user response in block 67. If the selected adaptation parameters do not provide the best chance of obtaining the sound quality for the current user response with the current congestion conditions, the adaptation parameters are reselected in block 65.

For example, a voice coder may be selected in block 65 that increase the number of packets generated each second. However, there may currently be a large packet loss rate in the VoIP call. The call adaptation system may then opt to add Forward Error Correction (FEC) to the VoIP call instead of increasing the bit rate of the voice coder.

The selected adaptation parameters are modified according to the monitored user response in block 69. The call adaptation system then continues to monitor congestion in block 61 and the user response in block 63. If adaptation parameters still require modification, the system repeats the process described above. For example, FEC may not reduce the packet loss identified in the congestion measurements, the call adaptation system 16 may then opt to use a higher quality voice coder and/or vary packet payload size.

The call adaptation system uses linear regression based on current congestion measurements to find the optimal adaptation points for each of the adaptation parameters. The congestion measurements ensure that an adaptation envelope stays within acceptable congestion bounds. Such bounds are usually established through either the absolute packet loss rate or a first derivative of the absolute packet loss rate.

For example, if the packet loss rate is increasing, the call adaptation system adapts by cutting down on total consumed bandwidth. This linear regression is conducted in block 59 of FIG. 4 where the adaptation parameters are modified according to the monitored congestion measurements.

Figure 5:
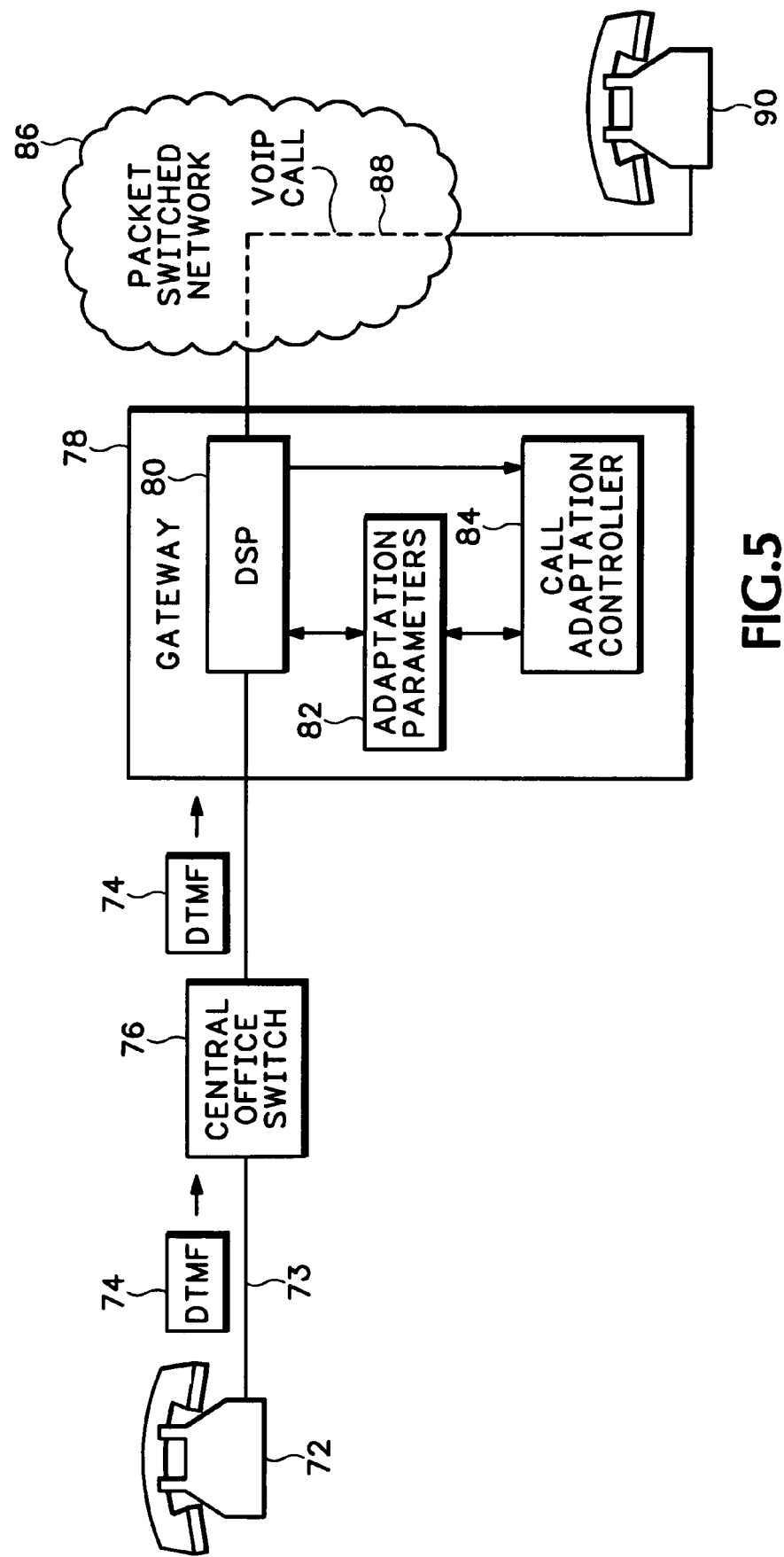
FIG. 5 a block diagram showing how the call adaptation system operates in a Plain Old Telephone System.

FIG. 5 shows another embodiment how Dual Tone Multiple Frequency (DTMF) signals are used to detect the user response to the VoIP call. A phone 72 is connected to a standard Plain Old Telephone Service (POTS) line 73. A user of phone 72 calls up a gateway 78 through a Central Office (CO) switch 76. The gateway 78 establishes a VoIP call 88 over a packet switched network 86 to another phone 90. The gateway 78 converts analog voice signals from phone 72 into VoIP packets.

The user of telephone 72 may wish to modify the sound quality of the VoIP call 88 as described above. The user generates a hook flash in phone 72 to first indicate a mode change to call adaptation controller 84. The user of phone 72 then presses buttons on the phone 72 to generate the DTMF signals 74. The pressed buttons identify the user response. For example, the "1" button by indicate a first sound quality request, the "2" button may indicate a higher sound quality request, etc. The CO switch 76 forwards the DTMF signals 74 to gateway 78. The call adaptation controller 84 detects the DTMF signals 84 and modifies the adaptation parameters 82 in an attempt to conform the quality of the VoIP call 88 to the user response represented by the DTMF signals 74. A Digital Signal Processor (DSP) 80 then uses the adaptation parameters 82 selected by call adaptation controller 84 to encode and transmit packets in VoIP call 88.

Graphical User Interface

Figure 6:
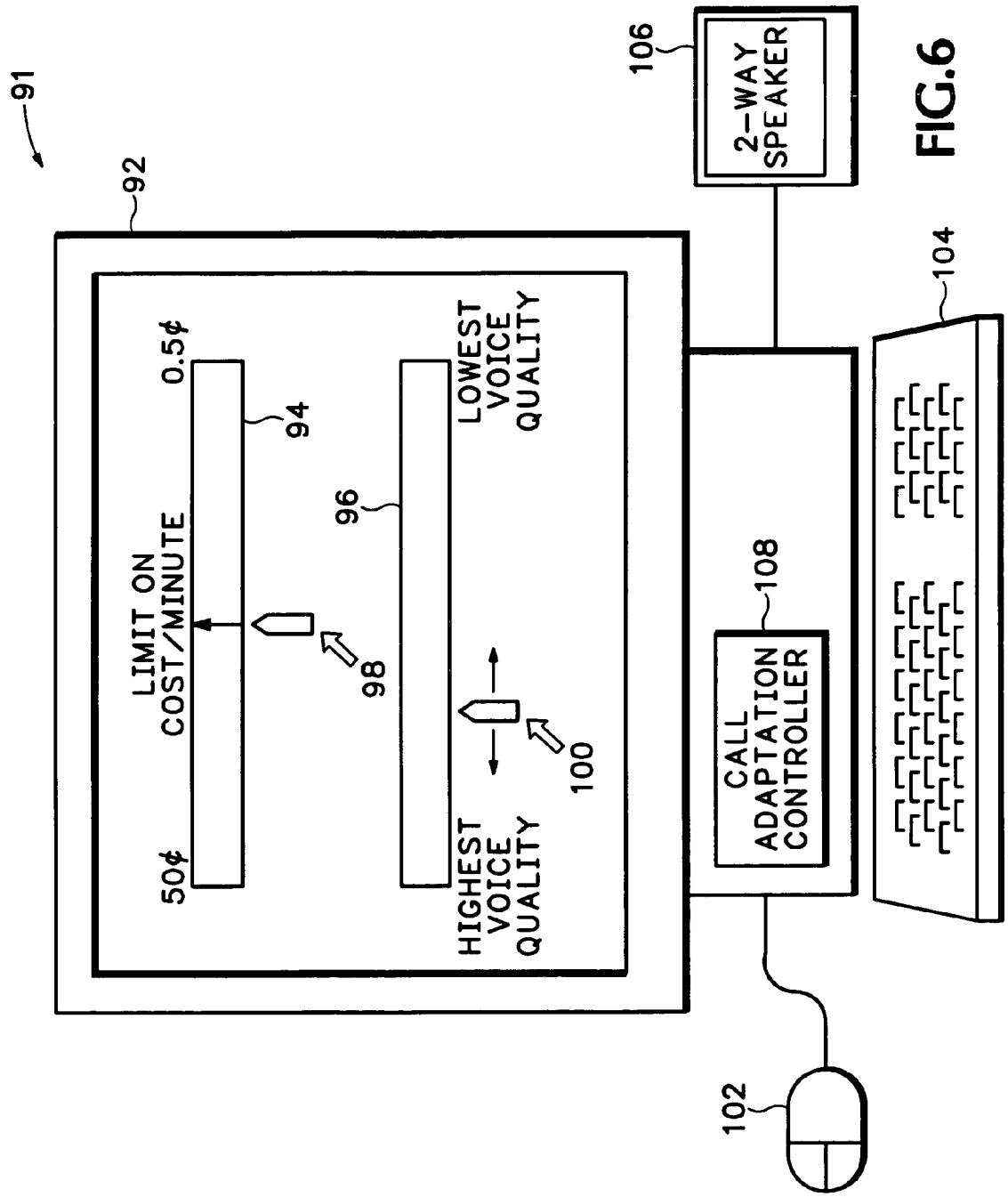
FIG. 6 a block diagram showing the call adaptation system is implemented with a graphical user interface.

FIG. 6 shows a computer 91 that includes a computer screen 92 and a keyboard 104. The computer 91 includes an audio communication device, such as two-way speaker 106 that allows a user to conduct a VoIP call. The user initiates the call by either dialing up a phone number or entering an Internet address of another VoIP endpoint. After the call is established, the user communicates using the two-way speaker 106, a headset, or alternative communication device.

During the VoIP call, the user can request the call adaptation controller 108 in computer 91 to vary sound quality of the VoIP call. A slider 96 is displayed on the screen 92 and allows the user to request changes in the sound quality. The user, either through a mouse 102 or the keyboard 104, moves a pointer 100 on slider 96. When pointer 100 is moved all the way to the left, the call adaptation controller 108 is notified that the user wants the highest sound quality. The user moves pointer 100 all the way to the right to request the lowest sound quality for the VoIP call.

In an Internet Service Provider environment, the service provider can offer different billing regimes for differing VoIP quality. The user can use inputs to the call adaptation controller 108 to see or control how much is being charged either before or during the VoIP call.

For example, the computer 91 also displays a slider 94 on screen 92 that identifies the cost of the VoIP call. The cost of the VoIP call may vary according to the used bandwidth, time of day, location of the VoIP endpoints, reservation of network resources, assigned call priority, etc. In one example, the cost is displayed on a cost per minute basis.

The user sees real time the result of requesting higher sound quality by viewing the cost slider 94. If the user is satisfied with the current sound quality, but would like to reduce call cost, the user can move pointer 100 to the right. If sound quality is inferior and the user does not object to increasing the call cost, the pointer 100 can be moved to the left.

The user can also move pointer 98 on slider 94 to limit the cost of the VoIP call. The pointer 98 is moved to the maximum amount that the user is willing to pay for the VoIP call. The call adaptation controller 108 then modifies the adaptation parameters to try and get the best possible sound quality for the selected call cost.

The devices used in the system described above can use dedicated processor systems, micro controllers, programmable logic devices, or microprocessors that perform some or all of the adaptation and voice processing operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A method for controlling a Voice over Internet Protocol (VoIP) call at a telephone endpoint, comprising:

determining a current payload size for audio packets in the VoIP call;
monitoring a user response to the VoIP call indicating a desired level of user perceived audio quality for the VoIP call;
determining a current jitter amount for the VoIP call; and
changing the current payload size for the audio packets mid-call to correspond with the desired level of user perceived audio quality only when the current jitter amount is less than a predetermined jitter amount that is preset and represents an acceptable perceivable sound quality.

2. A method according to claim 1 including:
initially transmitting the packets in the VoIP call using a best effort transmission scheme;
monitoring the user response for a request to increase voice quality; and
requesting reservation of network resources during the already established VoIP call when the increase voice quality request is detected from the user response.

3. A method according to claim 2 including requesting reservation of network resources by making an RSVP (Resource Reservation Protocol) request in the middle of the VoIP call.

4. A method according to claim 2 including conducting the already established VoIP call using reserved network resources when the requested reservation is accepted and the user response requests additional increases in the sound quality of the VoIP call.

5. A method according to claim 4 including increasing voice coder performance or reducing payload size after the network resources are reserved.

6. A method according to claim 1 including using a signal generated by an input device to detect the user response during the VoIP call.

7. A method according to claim 6 including using a dial or buttons on a telephone as the input device.

8. A method according to claim 6 including using a graphical user interface as the input device.

9. A method according to claim 1 including decoding Dual Tone Multiple Frequency signals to detect the user response.

10. An apparatus, comprising:
one or more processors; and
a memory coupled to the processors comprising instructions executable by the processors, the processors operable when executing the instructions to:
determine a current payload size for audio packets in the Voice over Internet Protocol (VoIP) call;
monitor a user response to the VoIP call indicating a desired level of user perceived audio quality for the VoIP call;
determine a current jitter amount for the VoIP call; and
change the current payload size for the audio packets mid-call to correspond with the desired level of user perceived audio quality only when the current jitter amount is less than a predetermined jitter amount that is preset and represents an acceptable perceivable sound quality.

11. The apparatus of claim 10 wherein the processors are further operable to:
initially transmit the packets in the VoIP call using a best effort transmission scheme;
monitor the user response for a request to increase voice quality; and
request reservation of network resources during the already established VoIP call when the increase voice quality request is detected from the user response.

12. The apparatus of claim 10 wherein the processors are further operable to conduct the already established VoIP call using reserved network resources when the requested reservation is accepted and the user response requests additional increases in the sound quality of the VoIP call.

13. An adaptation system, comprising:
an input to detect a user response requesting a different user perceived sound quality for a call and specifying a user-defined codec selection; and
a controller configured to measure current network congestion of a network that transmits the call and determine a packet loss ratio associated with the requested different user perceived sound quality, the user-defined codec selection and the measured current network congestion;
the controller to compare the determined packet loss ratio to a predetermined packet loss ratio that is set according to an empirical analysis identifying a threshold amount of packet loss that represents a minimum call sound quality;
the controller to dynamically vary a codec used to encode the call while the call is in progress according to the user-defined codec selection when the determined packet loss ratio is less than the predetermined packet loss ratio;
the controller to determine a system-defined codec selection corresponding to both the measured network congestion and the determined packet loss ratio when the determined packet loss ratio is equal to or greater than the predetermined packet loss ratio; and
the controller to dynamically vary the codec used to encode the call while the call is in progress according to the system-defined codec selection when the determined packet loss ratio is equal to or greater than the predetermined packet loss ratio.

14. An adaptation system according to claim 13 wherein the controller initially transmits packets in the call using a best effort transmission scheme and during the call requests reservation of network resources when the user response requests increased sound quality.

15. An adaptation system according to claim 14 wherein the controller initiates an RSVP (Resource Reservation Protocol) request to reserve the network resources.

16. An adaptation system according to claim 14 wherein the controller monitors for acceptance of the network reservation request and modifies the codec to provide an increased sound quality call only after the acceptance is received.

17. An adaptation system according to claim 13 wherein the input comprises a dial or buttons.

18. An adaptation system according to claim 13 wherein the input comprises a graphical user interface.

19. An adaptation system according to claim 18 including a cost icon in the graphical user interface that allows selection of a call cost, the controller restricting the system-defined according selection according to the selected call cost.

20. An adaptation system according to claim 13 wherein the input device generates Dual Tone Multiple Frequency signals that are decoded by the controller for identifying the user response.

21. An adaptation system according to claim 13 further comprising the controller modifying a packet payload size for the call in response to the requested different user perceived sound quality.

22. An adaptation system according to claim 13 wherein the controller varies a rate that the packets are transmitted and received during the call.

23. An electronic storage medium containing software used for controlling a Voice over Internet Protocol (VoIP) call, the software in the electronic storage medium comprising:
  code for determining a current payload size for audio packets in the VoIP call;
  code for monitoring a user response to the VoIP call indicating a desired level of user perceived audio quality for the VoIP call;
  code for determining a current jitter amount for the VoIP call;
  code for changing the current payload size for the audio packets mid-call to correspond with the desired level of user perceived audio quality only when the current jitter amount is less than a predetermined jitter amount that is preset and represents an acceptable perceivable sound quality.

24. An electronic storage medium according to claim 23 including;
  code for initially transmitting the packets in the VoIP call using a best effort transmission scheme;
  code for monitoring the user response for a request to increase voice quality; and
  code for requesting reservation of network resources during the already established VoIP call when the increase voice quality request is detected from the user response.

25. An electronic storage medium according to claim 24 including code that requests reservation of network resources by making an RSVP (Resource Reservation Protocol) request in the middle of the VoIP call.

26. An electronic storage medium according to claim 24 including code for conducting the already established VoIP call using reserved network resources when the requested reservation is accepted and the user response requests additional increases in voice quality of the VoIP call.

27. An electronic storage medium according to claim 26 including code for increasing voice coder quality and reducing packet payload size for the packets in the VoIP call after the network resources are reserved.

28. An electronic storage medium according to claim 23 including code that detects the user response from a signal generated by an input device controllable by a user during the VoIP call.

29. An electronic storage medium according to claim 28 wherein the input device comprises a dial on a telephone.

30. An electronic storage medium according to claim 28 wherein the input device comprises a graphical user interface on a computer.

31. An electronic storage medium according to claim 23 including code that decodes Dual Tone Multiple Frequency signals to identify the user response.

32. An electronic storage medium according to claim 23 including code for monitoring congestion in a network used for conducting the VoIP call and varying the current payload size according to the user response and the monitored congestion.

33. An electronic storage medium according to claim 23 including:
  code for varying codecs used for encoding audio signals into digital data making up the audio packets associated with the VoIP call data;
  code for varying a rate that the audio packets are transmitted and received during the VoIP call;
  code for varying an amount of audio data in the audio packets; and
  code for adding or removing error correction information from the audio packets.

34. An electronic storage medium according to claim 23 including code for detecting a user response selecting a cost for the VoIP call and varying the current payload size according to the selected cost.

35. A system for controlling a Voice over Internet Protocol call, comprising:
  means for tracking adaptation schemes used for transmitting audio packets in a VoIP call;
  means for monitoring a user response to the VoIP call indicating a desired level of user perceived audio quality for the VoIP call;
  means for dynamically varying the adaptation schemes used for transmitting the audio packets from a telephone endpoint in response to user indications so that the user perceived audio quality of the VoIP call corresponds with the monitored user response;
  means for measuring a first packet loss rate for the VoIP call before dynamically varying the adaptation schemes;
  means for measuring a second packet loss rate for the VoIP call after dynamically varying the adaptation schemes;
  means for comparing the first packet loss rate to the second packet loss rate; and
  means for automatically dynamically re-varying the adaptation schemes to lower bandwidth consumption in response to a determination that the second packet loss rate is a predetermined amount higher than the first packet loss rate.

36. A system according to claim 35 including means for detecting the user response from a signal generated by an input device controllable by the user during the VoIP call.

37. A system according to claim 35 including means for detecting the user response from a dial on a telephone.

38. A system according to claim 35 including means for detecting the user response from a graphical user interface on a computer.

39. A system according to claim 35 including means for decoding Dual Tone Multiple Frequency signals to monitor the user response.

40. A system according to claim 35 including means for monitoring congestion in the network used for conducting the VoIP call and varying the adaptation schemes having a best chance with the monitored congestion of adapting the VoIP call to the user response.

41. A system according to claim 35 including:
  means for varying codecs used for encoding audio signals into digital data making up the audio packets;
  means for varying a rate that the audio packets are transmitted and received during the VoIP call;
  means for varying an amount of audio data in the audio packets; and
  means for adding or removing error correction information from the audio packets.

42. A system according to claim 35 including means for detecting a user response selecting a cost for the VoIP call and means for varying the adaptation schemes according to the selected cost.

43. A system for controlling a Voice over Internet Protocol (VoIP) call, comprising:
  means for tracking packet payload size for a VoIP call;
  means for monitoring a user response to the VoIP call indicating delays associated with the VoIP call;

means for determining current network congestion;
means for dynamically varying the packet payload size during the VoIP call so that packets of the VoIP call include payloads of varying sizes according to the monitored user response when the current network congestion is lower than a predetermined threshold;
means for initially transmitting the packets using a best effort transmission scheme;
means for monitoring the user response for a request to increase voice quality; and
means for requesting reservation of network resources for the call during the already established VoIP call when the increase voice quality request is detected from the user response and when the current network congestion is below a predetermined threshold; and
means for indicating that the encoding process has not been dynamically varied when the current network congestion is not lower than a predetermined threshold.

44. A system according to claim 43 including means for requesting reservation of network resources by making an RSVP (Resource Reservation Protocol) request in the middle of the VoIP call.

45. A system according to claim 44 including means for increasing voice coder quality and reducing packet payload size for the packets in the VoIP call after the network resources are reserved.

46. A system according to claim 43 including means for conducting the already established VoIP call using reserved network resources when the requested reservation is accepted and the user response requests additional increases in voice quality of the VoIP call.

47. An apparatus comprising:
one or more processors; and
a memory coupled to the processors comprising instructions executable by the processors, the processors operable when executing the instructions to:
track adaptation schemes used for transmitting audio packets in a Voice over Internet Protocol (VoIP) call;
monitor a user response to the VoIP call indicating a desired level of user perceived audio quality for the VoIP call;
dynamically vary the adaptation schemes used for transmitting the audio packets from a telephone endpoint in response to user indications so that the user perceived audio quality of the VoIP call corresponds with the monitored user response;
measure a first packet loss rate for the VoIP call before dynamically varying the adaptation schemes;
measure a second packet loss rate for the VoIP call after dynamically varying the adaptation schemes;
compare the first packet loss rate to the second packet loss rate; and
automatically dynamically re-vary the adaptation schemes to lower bandwidth consumption in response to a determination that the second packet loss rate is a predetermined amount higher than the first packet loss rate.

48. The apparatus of claim 47 wherein the processors are further operable to monitor congestion in the network used for conducting the VoIP call and vary the adaptation schemes having a best chance with the monitored congestion of adapting the VoIP call to the user response.

49. The apparatus of claim 47 wherein the processors are further operable to:
vary codecs used for encoding audio signals into digital data making up the audio packets;
vary a rate that the audio packets are transmitted and received during the VoIP call;
vary an amount of audio data in the audio packets; and
add or remove error correction information from the audio packets.

50. The apparatus of claim 47 wherein the processors are further operable to detect a user response selecting a cost for the VoIP call and means for varying the adaptation schemes according to the selected cost.

51. The apparatus of claim 47 wherein the processors are further operable to detect the user response from a dial on a telephone.

52. A method for controlling a Voice Over Internet Protocol (VoIP) call, comprising:
tracking adaptation schemes used for transmitting packets in the VoIP call;
monitoring a user response to the VoIP call that requests a different level of user perceived sound quality for the VoIP call; and
dynamically varying the adaptation schemes used for transmitting the packets in the VoIP call to correspond with the requested level of user perceived sound quality; and
wherein dynamically varying the adaptation schemes includes adjusting Forward Error Correction (FEC) and adjusting packet payload length;
wherein the packet payload length is dynamically varied according to measured network congestion;
wherein the packet payload length is adjusted in response to a user indication of delays during the VoIP call;
wherein the packet payload length is increased in response to the user indication, wherein the packet payload length is associated with a first packet payload type having 20 bytes when the delay is less than a predetermined threshold and the packet payload length is associated with a second packet payload type having at least 40 bytes when the delay is greater than the predetermined threshold.

* * * * *